United States Patent [19]
Webb

[11] 3,952,704
[45] Apr. 27, 1976

[54] HEAD-SET APPARATUS FOR TRAINING HORSES

[76] Inventor: Joe A. Webb, E. Lincoln St., Searcy, Ark. 72143

[22] Filed: July 18, 1974

[21] Appl. No.: 489,528

Related U.S. Application Data

[62] Division of Ser. No. 364,632, May 29, 1973, Pat. No. 3,824,961.

[52] U.S. Cl............................. 119/29; 54/71
[51] Int. Cl.².............................. A01K 15/00
[58] Field of Search............. 119/29, 27, 98; 54/71, 54/72

[56] References Cited
UNITED STATES PATENTS

| | | | |
|---|---|---|---|
| 105,814 | 7/1870 | Kraus.................................. | 119/27 |
| 741,873 | 10/1903 | Barcus........................ | 119/98 UX |

*Primary Examiner*—Hugh R. Chamblee
*Attorney, Agent, or Firm*—Harrington A. Lackey

[57] ABSTRACT

A head-set apparatus for training a horse including an enclosure frame for receiving the horse and a linear member, having connector means at each end, one of the connector means being detachably connected to the horse's head harness, while the other connector means is detachably and adjustably connected to some portion of the frame for holding the horse's head in a desired attitude. The head-set apparatus may include one or two arm members, preferably mounted upon the frame for movement fore and aft, the linear member connecting the horse's head to the arm members. The arm member is preferably provided with means for biasing the arm member rearward against the forward pull of the horse's head through the linear member.

14 Claims, 15 Drawing Figures

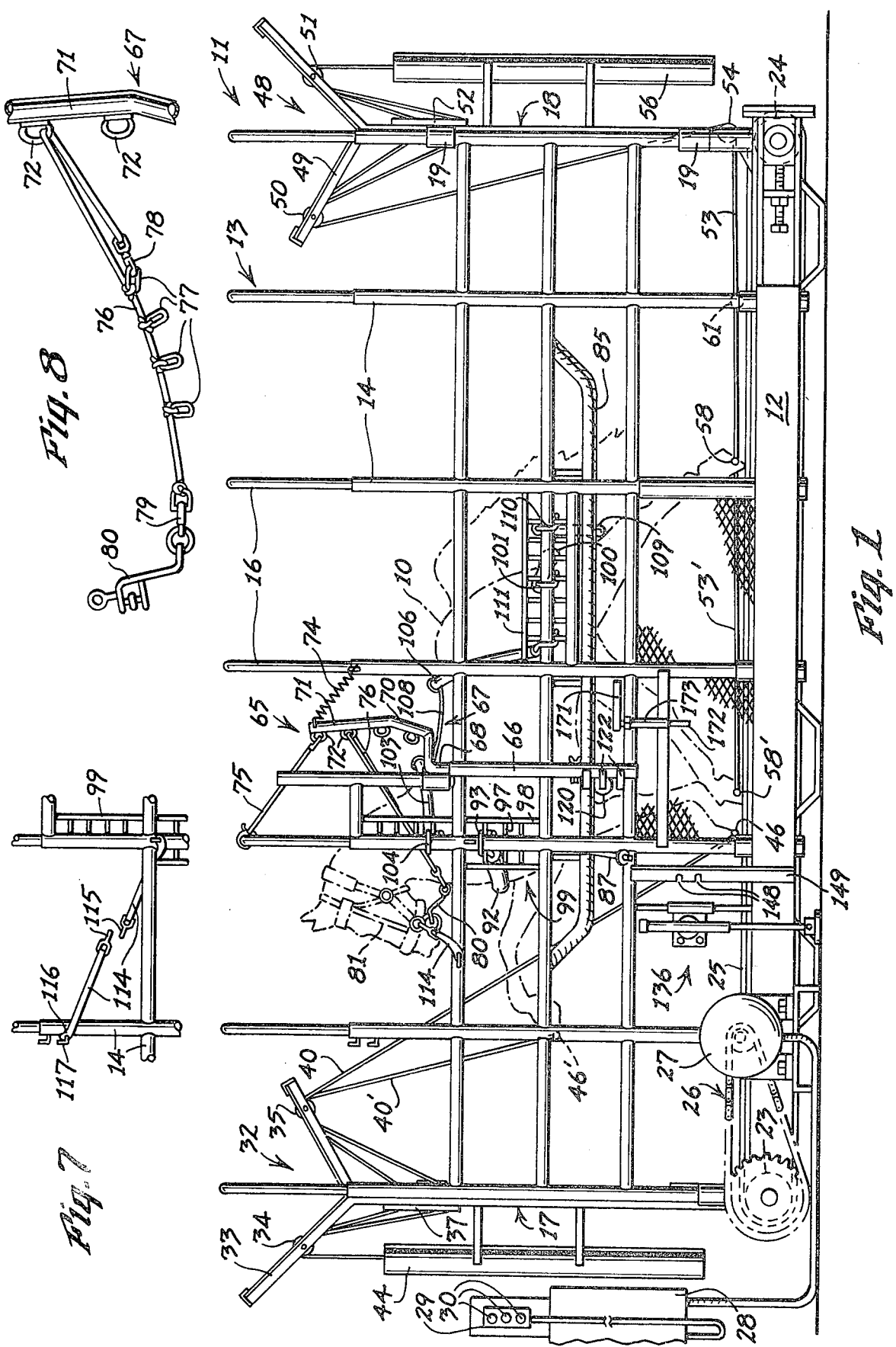

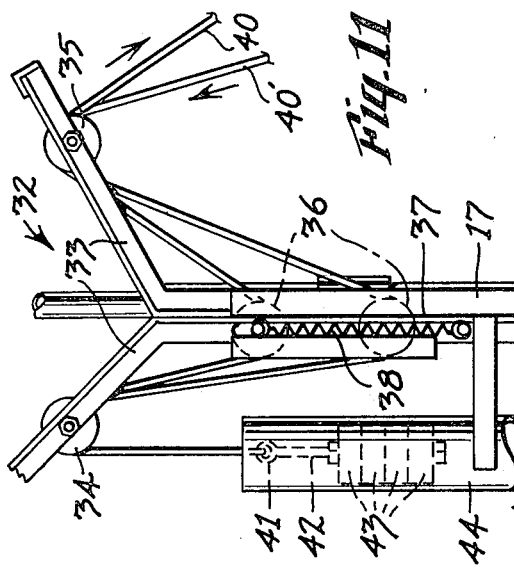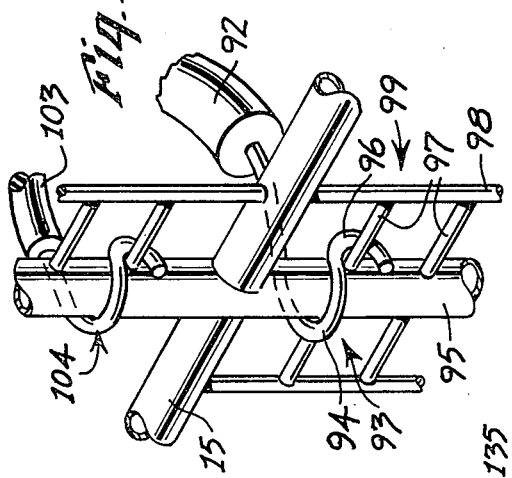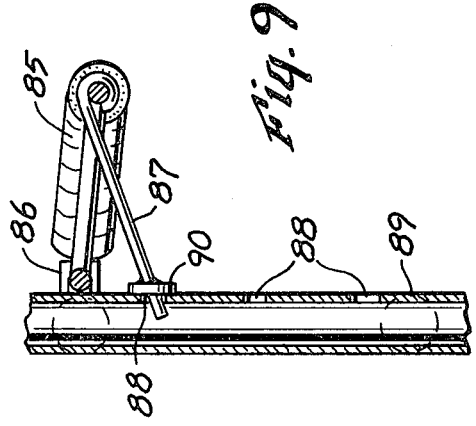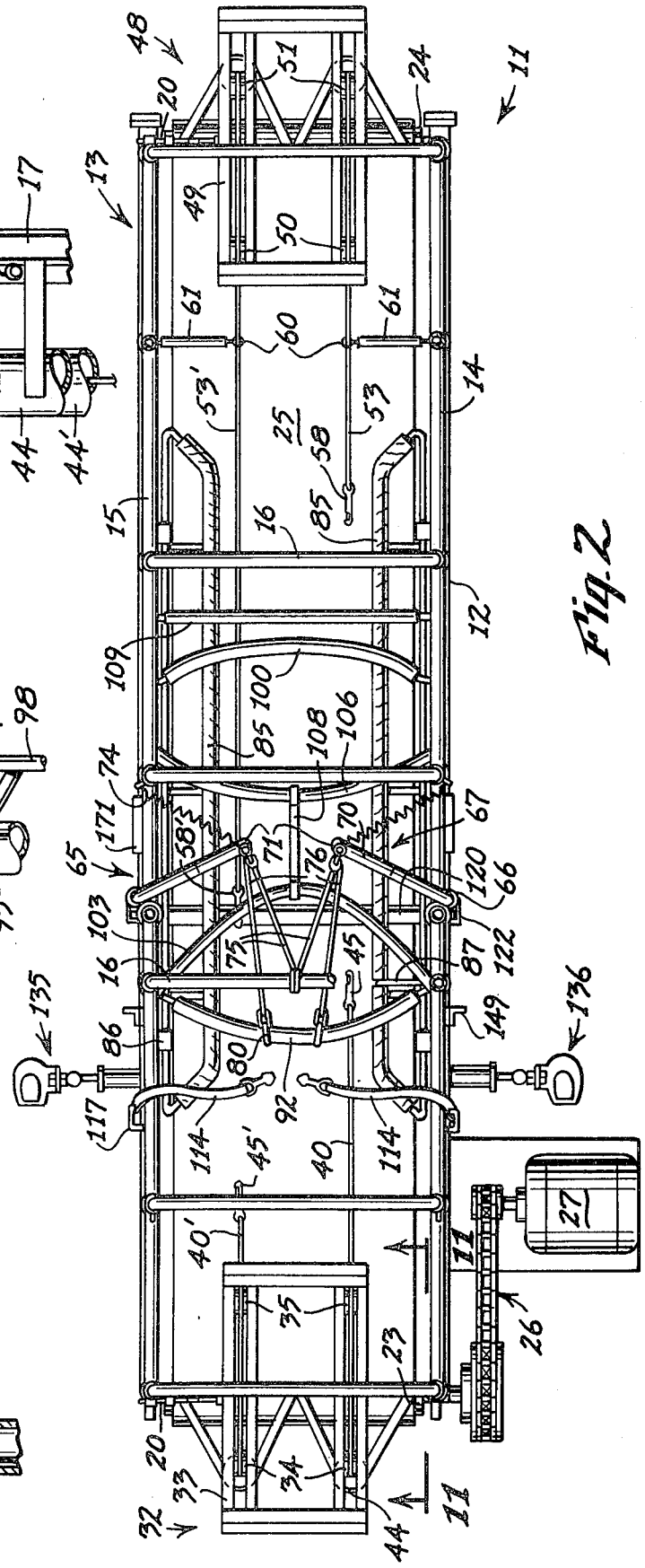

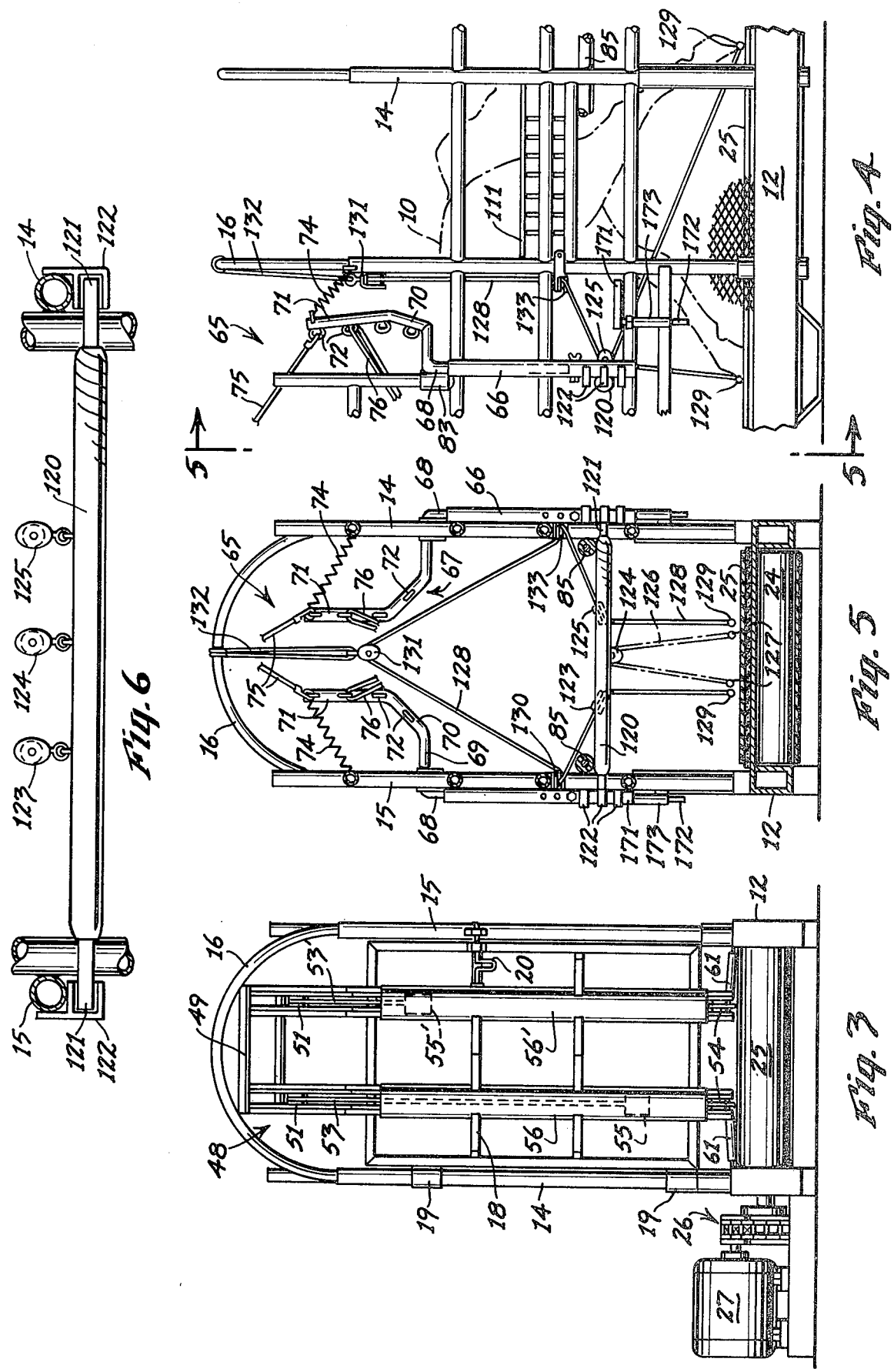

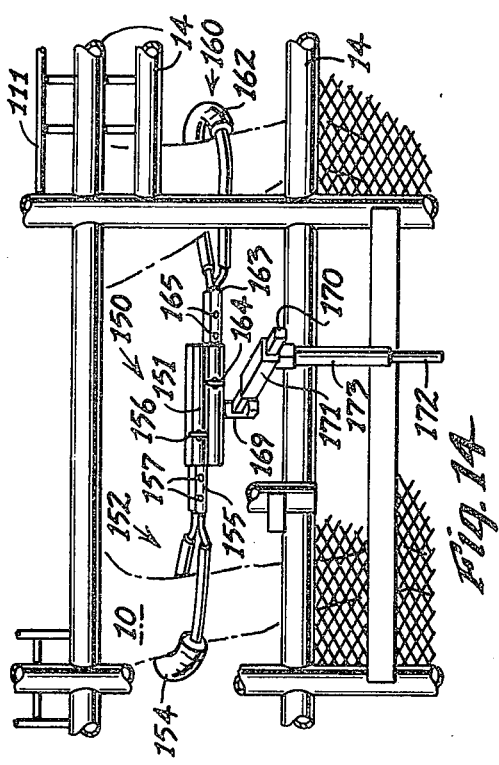
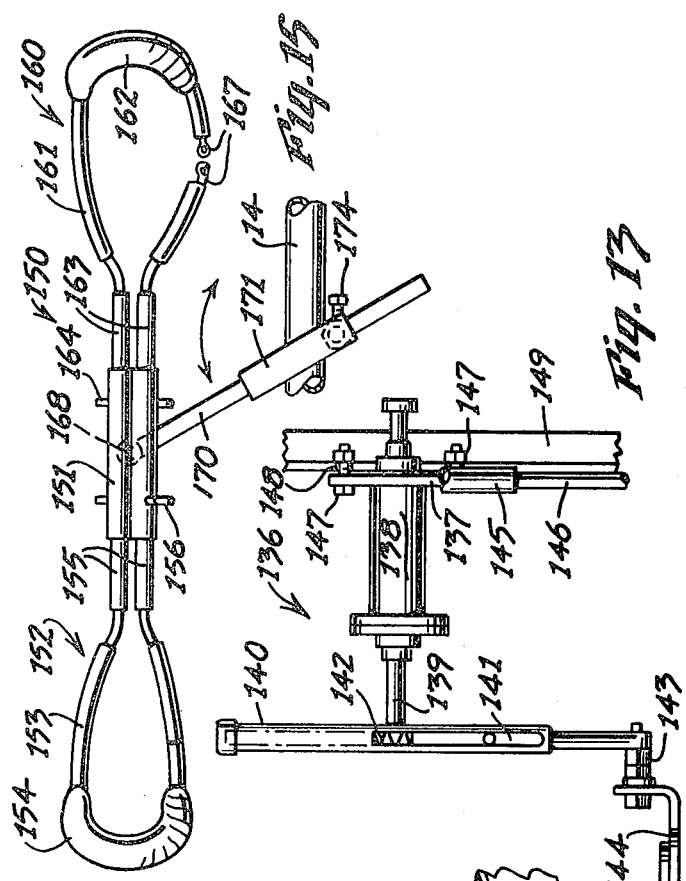
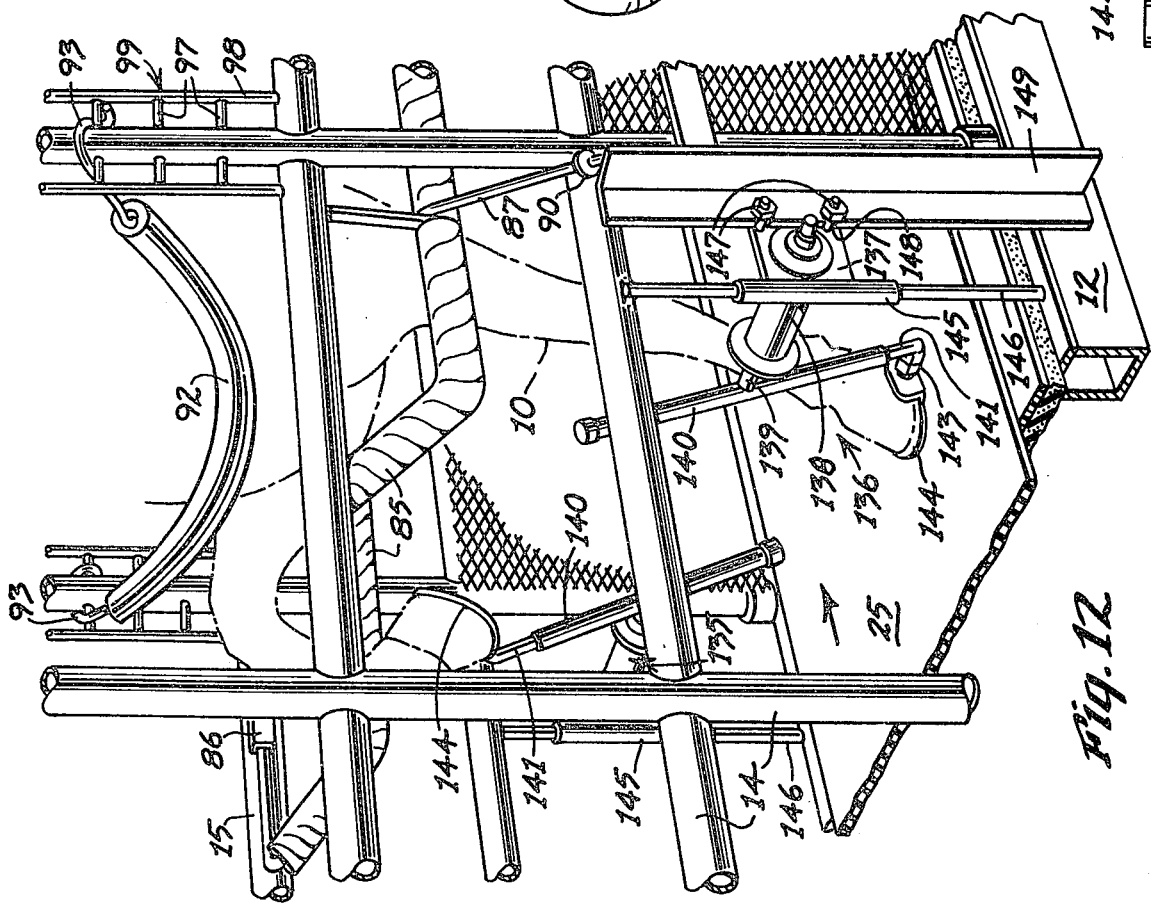

HEAD-SET APPARATUS FOR TRAINING HORSES

CROSS-REFERENCE TO RELATED APPLICATION

This application is a division of application Ser. No. 364,632, filed May 29, 1973, now U.S. Pat. No. 3,824,961, issued July 23, 1974.

BACKGROUND OF THE INVENTION

This invention relates to a horse training apparatus, and more particularly to an apparatus for training a horse to perform particular gaits.

In the training of horses, and particularly a Tennessee Walking Horse, the horse is taught to perform his various exercises by the trainer riding astride the horse. Unless there are two trainers, one astride the horse and one on the ground, it is difficult for a single trainer astride the horse to observe the progress of the horse and the appearance of the gaits.

U.S. Pat. No. 882,584 of Rausmussen and French Pat. No. 613,168 illustrate harnesses adapted to be supported upon the horse for training the horse to arch his neck.

However, to the applicant's knowledge, there is nothing in the prior art to train a horse, while walking within an enclosure, including a head-set device connecting the horse's head harness to the enclosure frame.

SUMMARY OF THE INVENTION

It is therefore an object of this invention to provide an apparatus for teaching or training horses various gaits, and particularly the gait of a Tennessee Walking Horse, while the horse is walking relative to an enclosure frame, with the trainer having the option of observing the progress of the horse without being astride the horse.

A head-set device is swingably mounted upon the frame and yieldably supported above the horse to arch the horse's neck through reins connecting the bit of the horse's bridle to various adjusted positions upon the head-set device.

The head-set device made in accordance with this invention can also include one or more elongated linear members having detachable connectors at opposite ends, such as flexible cross-ties. One of the ends is detachably connected to the horse's head harness, such as to the bridle bit, while the opposite end is adapted to be detachably connected by appropriate connector means to various portions of the enclosure frame to set or hold the horse's head in a predetermined attitude while he moves through his paces.

BRIEF DESCRIPTION OF THE DRAWINGS

FIG. 1 is a side elevation of the apparatus made in accordance with this invention, illustrating a horse in operative position for learning the gaits of a Tennessee Walking Horse;

FIG. 2 is a top plan view of the apparatus illustrated in FIG. 1, with the horse removed and with parts broken away for clarity;

FIG. 3 is a rear elevation of the apparatus;

FIG. 4 is a fragmentary side elevation of the rear portion of the apparatus illustrating a modified striding device;

FIG. 5 is a section taken along the line 5—5 of FIG. 4;

FIG. 6 is an enlarged fragmentary plan view of the transverse striding bar and its mounting means, FIG. 7 is a fragmentary side elevation of a front portion of the frame supporting some cross-tie straps;

FIG. 8 is a fragmentary side elevation of a portion of a head-set device;

FIG. 9 is a fragmentary sectional elevation disclosing the side bar adjustably supported in an elevated position;

FIG. 10 is a fragmentary perspective view illustrating the hook member connection of two of the padded belt members;

FIG. 11 is a section taken along the line 11—11 of FIG. 2;

FIG. 12 is an enlarged perspective view of the pedal step devices operating upon the front feet of a horse;

FIG. 13 is a fragmentary front elevation of one of the pedal step devices illustrated in FIG. 12;

FIG. 14 is a fragmentary side elevation of the gait synchoronizing device attached to the apparatus and to the horse; and FIG. 15 is a fragmentary top plan view of the synchronizing device illustrated in FIG. 14.

DESCRIPTION OF THE PREFERRED EMBODIMENTS

Referring now to the drawings in more detail, a horse 10 is illustrated in phantom, in FIG. 1, harnessed in position in the training apparatus 11 for teaching the horse 10 to execute various paces or gaits, such as the gait of a Tennessee Walking Horse.

The apparatus 11 includes a base frame 12 adapted to rest upon a level surface, such as the ground, and supporting an enclosure frame 13 for the horse 10. The enclosure frame 13 includes a pair of side frame members 14 and 15 fabricated from vertical and horizontal bars, the upper ends of which are tied together by the transverse bow frames 16.

The open ends of the enclosure frame 13 are normally closed by a front gate member 17 and a rear gate member 18. As best disclosed in FIG. 3, the rear gate member 18 is supported along one edge by hinge 19, and is secured in closed position along its opposite edge by a latching mechanism 20. The front gate member 17 has the same construction as the rear gate member 18. It is also within the scope of this invention to employ only a single gate member, either the front gate member 17 or the rear gate member 18, with the opposite end of the enclosure frame 13 being permanently closed by a rigid end frame member, not shown.

Mounted for rotation in the base frame 12 is a head pulley 23 and a tail pulley 24 about which is trained the endless conveyor belt or tread member 25. The head pulley 23 is driven through the sprocket-and-chain transmission 26 from the motor 27, in such a direction that the top leg of the belt member moves from front to rear, and forms the floor of the enclosure frame 13.

The open space within the enclosure frame 13 defined by the tread member 25, the front and rear gate members 17 and 18, the side members 14 and 15 and the overhead bow frames 16 is sufficient not only to receive horses of different sizes, but also to permit the horses to perform their training exercises.

The motor 27 is controlled through an electrical control box 28, preferably actuated through a remote control hand piece 29 with control buttons 30 (FIG. 1).

Mounted upon the front gate member 17 is the front pacer assembly 32, including a Y-shaped frame 33 supporting a pair of front pulleys 34 upon the front leg of the Y-frame 33 and a pair of rear pulleys 35 rotatably supported upon the rear leg of the Y-frame 33. A pair of take-up pulleys 36 are confined to vertical linear movement in corresponding guide tracks 37 forming a part of the frame 33. Each take-up pulley 36 is biased downward, not only by gravity, but also by coil spring 38. A front pulley 34, a take-up pulley 36 and a rear pulley 35 are located in the same vertical longitudinal plane on the left side of the machine, while their counterpart pulleys are similarly located in a vertical longitudinal plane on the right side of the machine. A left front cable 40 or other flexible linear member, is trained about the left set of pulleys 35, 36 and 34, terminating at its front end in a connection 41 to a weight carrier 42 for receiving one or more weights 43 within a vertical cylindrical weight guide 44.

The rear end of the left cable 40 is provided with a connector, such as a snap hook 45 (FIG. 2), for connection to a mating connector, such as eye-bolt 46 embedded in the shoe of the horse 10 (FIG. 1).

In a similar manner, a right front cable 40' is trained over the right set of pulleys 35, 36 and 34, the front end of which is connected to a set of weights, identical to the weights 43, but contained within the right front weight guide cylinder 44'. The rear end of the right front cable 40' is also provided with a snap hook 45' (FIG. 2) for connection to an eye-bolt 46' (FIG. 1) embedded in the shoe of the right front hoof of the horse 10.

Mounted upon the rear gate member 18 is the rear strider assembly 48 including another Y-shaped frame 49 similar in construction to the Y-frame 33 of the front pacer assembly 32. Supported for rotation upon the front and rear legs of the Y-frame 49 are a pair of front pulleys 50 and a pair of rear pulleys 51, respectively. Intermediate pulleys identical to the intermediate pulleys 36, but hidden from view, are confined to vertical linear movement within the guide tracks 52. A left rear cable 53 is trained about a lower rear pulley 54 rotatably mounted at the bottom of the Y-frame 49, then upward and over the forward pulley 50, then beneath the intermediate or take-up pulley in the vertical track 52, then upward and over the rear pulley 51. The rear end of the cable 53 also terminates in a weight carrier similar to weight carrier 42 for supporting the weights 55 within the weight guide cylinder 56. The front end of the left rear cable 53 is also connected by any appropriate connectors, such as a snap hook and eye-bolt, similar to snap hook 45 and eye-bolt 46, to the shoe of the left rear hoof of the horse 10, the connectors being indicated by the reference numeral 58.

In a similar manner, the right cable 53' is connected to the right rear hoof by the connectors 58', and is trained over a set of right pulleys 54, 50, the hidden intermediate pulley, and the rear pulley 51, terminating in a set of weights 55' within the weight guide cylinder 56'.

In order to prevent the lower portions of the cables 53 and 53' extending between the horse's hooves and the lower pulleys 54 from becoming entangled in the horse's rear feet, these cable portions extend through guide rings 60 mounted on the ends of padded arms 61, which are rigidly held to the opposed side frame members 14 and 15.

Thus, the rear strider assembly 48 is practically identical to the front pacer assembly 32, with the exception of the addition of the lower pulleys 54 and the guide rings 60 to the strider assembly 48.

In order to hold the horse's head at the proper angle, a head-set device 65 is mounted on the enclosure frame 13, and is best illustrated in FIGS. 1, 2, 4 and 5. The head-set device 65 includes a pair of vertical socket columns 66 fixed to the opposite side frame members 14 and 15. Received within each socket column 66 is a yoke or arm member 67 having a lower vertical portion 68 axially received within the socket column 66 for vertical adjustment relative to the socket column 66. The yoke member also includes a laterally inturned arm portion 69, an angular arm portion 70 and an upright or rein post 71. Disposed on the front of each upright 71 and the angular portion 70 are a plurality of substantially vertically spaced rings 72. Each yoke member 67 is freely rotatable about the vertical axis of its lower post portion 68 but this rotary motion is limited by the attachment of the upper ends of the uprights or rein posts 71 to the side frame members 14 and 15 by the coil springs 74. The front portions of the rein posts 71 are secured to an upper bow frame 16 in front of the head-set device 65 by means of the elastic linear members 75.

As best illustrated in FIGS. 1 and 8 a trainer rein 76 is provided with a plurality of longitudinally spaced rings 77 and a snap hook 78, or other appropriate connector, at its rear end. The front end of the rein 76 is also provided with an appropriate connector, such as a snap hook 79 for attachment to the bit 80 of the horse's bridle 81, halter or head harness. By first connecting the snap hook 79 to the bit 80, the rear end portion of the rein 76 is looped through one of the rings 72 on the rein post 71, and the rear snap hook 78 is connected to the ring 77 which will support the head of the horse 10 in the desired attitude, such as that disclosed in FIG. 1. Not only is the effective length of the rein 76 adjustable by means of the spaced rings 77, but the height of the rein 76, and therefore the height of the horse's head, is also adjustable by means of the vertically spaced rings 72 upon the rein post 71. The reins 76 are set to arch the horse's neck and to hold the horse's head perpendicular to the ground or floor.

As the horse 10 exercises with the head-set device 65 in operative position, the movement of the horse's head will cause both reins 76, and thereby the rein posts 71 to reciprocate fore and aft against the resistance of the elastic linear members 75 and the coil springs 74. The tension in the elastic members 75 and springs 74 may be adjusted by any desired means.

As best illustrated in FIG. 4, a resilient bumper or cushion 83 is fitted around a fixed vertical bar of the side frame 14, and is adapted to resiliently resist the forward movement of the yoke member 67, when the portion 68 swings forward against the bumper 83. The bumper 83 thus protects the mouth of the horse 10 when the horse pushes forward against the bit 80.

In order to adjust the width of the space within the enclosure frame 13 for different size horses 10, and also to center the horse 10 within the frame 13, a pair of elongated padded side bars 85 are mounted on the insides of the opposite side frame members 14 and 15. The end portions of each side bar 85 is journaled within the bearing 86 upon the side frame members 14 and 15 for swinging movement between upper positions opposing each other and downward positions substantially flush against the insides of the side frame members 15. FIG. 9 discloses one of the side bars 85 supported in an upright position by a brace arm 87 having one end journaled about the side bar 85, and the other end projecting through one of a plurality of vertically spaced apertures 88 within a vertical column member 89. The projection of the end portion of the brace arm 87 through a corresponding aperture 88 is limited by the stop flange 90.

In order to confine the horse 10 within the enclosure frame 13, a front padded restraining belt 92 is secured in front of the horse 10, as best disclosed in FIG. 1, between the opposite side frame members 14 and 15. Each end of the front restraining belt 92 is provided with a unique hook member 93, best disclosed in FIG. 10. The hook member 93 is provided with a large or primary bight portion 94 adapted to extend about halfway around the vertical column 95 forming a part of either of the side frame members, such as the side frame member 15 disclosed in FIG. 10. The free end of the bight portion 94 forms a secondary bight portion 95 in a plane at right angles to the plane of the primary bight portion 94, to enable the secondary bight portion 95 to extend substantially halfway around the horizontal attachment bar 97. As illustrated in FIG. 10, a plurality of vertically spaced horizontal attachment bars 97 are fixed to and project radially from the vertical post 95 and terminate in another parallel vertical rod 98 to form a substantial ladder structure 99. The vertically spaced attachment bars or rungs 97 permit optional vertical connection for the hook member 93.

A rear restraining belt 100, which may be identical in construction to the front restraining belt 92, is secured to the side frame members 14 and 15 by hook members 101 identical in construction to the hook members 93.

With the front and rear restraining belts 92 and 100 in place, the horse is confined to extremely limited forward and rearward motion. The rear restraining belt 100 not only prevents the horse from backing up, but also prevents the horse from being carried out the back gate as the conveyor belt or tread member 25 moves rearward.

A padded rearing strap or belt 103 extends across the horse's withers and is provided with hook members 104 identical to hook members 93.

In a similar manner, a padded kicking strap 106 extends across the horse's loin or rump, and is also provided with hook members 107 identical to the hook members 93. In order to hold the kicking strap 106 in place, a connecting strap 108 extends longitudinally across the top of the back of the horse with its ends tied respectively to the rearing strap 103 and the kicking strap 106.

As best illustrated in FIGS. 1 and 2, an auxiliary rear constraining or safety belt 109 provided with hook members 110 is connected to the side frame members 14 and 15 and extends across the rear of the horse below the rear restraining belt 100 as an additional safety feature. The auxiliary rear belt 109, being lower than the rear restraining belt 100 prevents rearward movement of the horse if it should be of lesser height than the normal horse, or if the horse's rear feet get out from under him so that the horse's rump might slip beneath the rear restraining belt 100.

All of the hook members 93, 101, 104, 107 and 110 are not only identical in construction, but are also adapted to engage identically constructed ladder attachment structures 99 and 111. The ladder attachment structures 99 extend vertically, while the ladder attachment structures 111 extend horizontally.

The horse's head may also be secured in various positions and attitudes for limited motion by a head-set apparatus comprising cross-tie strap 114 (FIGS. 1, 2 and 7). One end of each cross-tie strap 114 has a snap hook 115, or other connector, for detachable connection to the horse's head harness 81, such as the bridle bit. A snap hook or other type of loop or hook connector 116 is formed at the opposite end of each cross-tie strap 114 for connection to appropriate hook-shaped brackets 117 (FIG. 7).

Several cross-tie straps 114 may be employed in the head-set apparatus to hold the horse's head in the desired attitude. The positions of two such cross-tie straps 114 are disclosed in FIG. 7. The connectors 116 of straps 114 could also be connected to appropriate connectors 117, not shown, on any portion of the bow frame 16, either in front of the horse's head, or behind the horse's head, or both. Such cross-tie straps 114 could exert tension upward on the horse's head, as well as forward or rearward. The rear cross-tie strap 114 in FIG. 7 can also be attached to exert rearward, and even downward, tension on the horse's head. The versatility of the positions and combinations of the cross-tie straps 114 in setting the horse's head is almost unlimited.

As best disclosed in FIGS. 4, 5 and 6, an elongated padded striding bar 120 is adapted to extend transversely beneath the horse and is provided with square cross-sectional end portions 121 for resting in corresponding shaped, vertically spaced sockets 122. The vertically spaced sockets 122 permit vertical adjustment of the striding bar 120 for horses of different sizes.

Supported upon the rear side of the striding bar 120 are a right pulley or sheave 123, a middle pulley 124 and a left pulley 125. As best disclosed in FIG. 5, a single flexible linear member such as the cable 126 may be looped through the single middle pulley 124 and provided at its ends with connectors 127 for connection to complementary connectors, such as eye-bolts 58 and 58', in the shoes of the hooves of the horse 10. Thus, as one rear hoof moves forward, it will pull the opposite rear hoof rearward through the interconnection of the hooves by means of the single cable 126 and middle pulley 124. The arrangement of the single cable 126 through the middle pulley 124, not only teaches the horse to stride better, but also minimizes the hind legs spreading too far apart. Preferably, the single cable 126 is elastic so that it may yield under the striding motions of the horse's hind feet, without hobbling or tripping the horse while he is learning.

Another arrangement for the striding bar 120 to perfect the striding of the horse, is the provision of a longer cable 128 for use with the left and right pulleys 123 and 125. The cable 128 is also provided with connectors 129 for connection to complementary connectors on the shoes of the horse's hind hooves, such as eye-bolts. The right connector 129 is connected to the right shoe. The cable 128 is trained over right pulley 123 on the striding bar 120, then over right pulley 130 fixed to the right side frame member 15, and then over the top pulley 131 suspended by an elastic member 132 from the overhead bow frame 16. The cable 128 then extends down around the left side pulley 133 fixed to the left side frame member 14, thence around the left pulley 125 on the striding bar 120, and then to the left connector 129, which is secured to the left shoe. The cable 128 may be elastic, or inelastic, with sufficient elasticity being provided by the overhead elastic member 132. FIG. 4 illustrates cable 128 connected to the hind feet of the horse 10 to teach the horse to stride.

FIGS. 12 and 13 illustrate a pair of pacer or overstepping devices 135 and 136 for attachment to the front feet of the horse 10, which may be used in lieu of the front pacer assembly 32 in order to teach the horse to fold and reach. Except for the fact that they are mirror images of each other, the construction of the pacer devices 135 and 136 are identical. Accordingly, only the construction of pacer device 136 will be described.

The pacer or pedal step device 136 includes a base plate 137 to which is fixed a laterally projecting journal housing 138 rotatably receiving the transverse shaft 139 for free rotation about its longitudinally horizontal axis. Fixed perpendicular to the inner end of the trnsverse shaft 138 is a tubular housing 140 telescopingly receiving through one end thereof, a foot-supporting rod 141. The foot rod 141 is biased outward through the open end of the housing 140 by a spring 142 compressed within the housing 140 between the inner end of the foot rod 141 and the closed end of the housing 140. Connected to the remote end of the foot rod 141 by a journal 143 is a foot support or pedal 144 comprising a shoe adapted to be secured to the left front hoof of the horse 10. One edge of the base plate 137 forms a vertical sleeve 145 journaled about a vertical rod 146 fixed to the left side frame member 14. The opposite edge of the base plate 137 is provided with laterally projecting bolt-and-nut connectors 147 adapted to be secured in operative fixed position within one of the vertically spaced bolt slots 148 in vertical angle bracket 149 fixed to the side frame member 14. The base plate 137 is disclosed in its fixed operative position in FIGS. 12 and 13. In FIG. 1, the pacer device 136 is disclosed swung through 180° outside the side frame member 14 and disengaged from the bracket slots 148, in its inoperative position.

FIGS. 14 and 15 disclose a gait synchronizing device 150 including a four-barrel housing 151 including a pair of top barrels or sleeves arranged above a pair of bottom barrels or sleeves, each barrel having open ends. The gait synchronizing device 150 includes a front leg attachment member 152 consisting of a padded wire loop element 153 with the front portion having additional padding 154, and adapted to fit around the front leg of the horse. The rear portion of the loop element 153 terminates in a pair of rearward projecting prongs 155 adapted to be telescopingly received within the top pair of barrels 151, and held in fixed position by the keys 156 extending through registering apertures 157 (FIG. 14).

A rear leg attachment member 160 includes a similar, padded, wire loop element 161 having its rear portion covered with supplementary padding 162, to fit around the rear leg of the horse 10. The front portion of the attachment member 160 includes a pair of forward projecting prongs 163 adapted to be received in the pair of lower barrels or sleeves 151, and also secured in position by the keys 164 extending through the registering apertures 165. Either or both loop elements 153 and 161 may have one side portion broken and hinged, or provided with detachable connectors, such as 167 of the attachment member 160 in FIG. 15.

Depending from the bottom of the four barrel body 151 is a shaft 168 journaled in sleeve 169 fixed to laterally extending swing bar 170 telescopingly received in the sleeve 171. Depending from the sleeve 171 is a journal shaft 172 rotatably and vertically received within a sleeve 173 fixed to the side frame member 14.

The shaft 172 may be vertically adjusted within the sleeve 173 by means of the set screw 174. (FIG. 15).

To operate the gait synchronizing device 150, the front leg attachment member 152 is fitted around the front leg of the horse 10, as illustrated in FIG. 14, and the prongs 155 are inserted into the top barrels 151 and secured in place by the keys 156. In a similar manner, the rear leg attachment 160 is fitted around the rear leg of the horse 10 on the same side of the horse as the front leg to which the attachment member 152 is secured. The rear prongs 163 are then inserted into the bottom pair of barrels 151 and secured in fixed position by the keys 164. The longitudinal spacing of the front and rear leg attachment members 152 and 160 may be adjusted by inserting the keys 145 and 164 in the corresponding set of longitudinally spaced apertures 157 and 165 to accommodate the longitudinal spacing between the front and rear legs of the horse 10. As the tread member 24 moves rearward, the horse's left front and rear legs secured in the device 150, as illustrated in FIG. 14, move rearward together, and are also lifted and moved forward together so that a gait is produced in which the left legs of the horse move in the same direction simultaneously, while the right legs of the horse also move in the same direction simultaneously.

When the gait synchronizing device 150 is not in use, and the leg attachment members 152 and 160 are removed from the horse's legs, the entire device 150 may be swung outside the enclosure frame 13, with the swing shaft 170 completely removed from the housing 171, so that only the cylinder 173, vertical rod 172 and the swing sleeve 171 remain, as illustrated in FIGS. 1 and 4.

In the operation of the apparatus 11 for teaching a horse 10 a particular gait, the horse 10 is led into the enclosure frame 13 through either of the gates 17 or 18, and to the position illustrated in FIG. 1. The horse 10 is constrained to this position by means of the front restraining belt 92 and the rear restraining belts 100 and 109. If desired, or needed, the bridle bit 81 may be connected by cross-tie straps 114. A rearing strap 103 may be connected across the withers of the horse 10 and a kicking strap 106 may be applied across the loin of the horse and secured to the rearing strap 103 by the connecting strap 108.

The head-set device 165 is swung into position across the back of the horse, connected to the elastic members 74 and 75, and the trainer reins 76 are slipped through the rings 72 and adjusted to the desired length by connecting the connectors 78 and 77. Snap hooks 79 are then connected to the bit 80 of the bridle 81 to set the horse's head in the desired vertical position with an arched neck. All four hooves of the horse are connected to the various cables 40, 40', 53 and 53' of the pacer and strider assemblies 32 and 48.

The motor 27 is then started by manually pushing one of the buttons 30, and the speed of the treadmill or belt 25 is controlled by pushing another of the buttons 30. The weighted cables 40 and 40' will cause the horse's front feet to overstep, or fold and reach, in order to attain the desired overstepping of a walking horse. The weighted cables 53 and 53' tensioned to pull straight backward cause the horse's rear feet to stride in an exaggerated manner. The weights of the rear strider assembly 48 are selected to cause each of the horse's rear feet, ultimately to stride forward a sufficient distance to overstep the front track of the corresponding front foot, as illustrated in FIG. 1.

When desired, the pedal-type pacer devices 135 and 136 may be substituted for the front pacer assembly 132.

Also, the gait synchronizing device 150 may be connected to the front and rear left legs, while a similar gait synchronizing device 150 can be mounted to the right front and rear legs in order to obtain the desired gait.

The side bars 85, are of course adjusted to accommodate the width of the horse and to center him upon the tread member 25.

After the horse's training period is over, the head-set device 65 may be disconnected by disconnecting the connectors 78 and/or 79, and/or the connectors 115 or 117 of the cross-tie straps 114. In this manner, the horse's bridle or head harness 81 is disconnected from the frame. When the head-set device 65 is employed, the elastic members 75 and coil spring 74 are disconnected from the rein posts 71, and the arm or yoke members 67 are swivelled about the vertical axes of the lower post portion 68 outward until they are out of the way of the horse 10 so that he can be led out of either end of the enclosure frame 13.

It is also within the scope of this invention to remove the enclosure frame 13 with all the trainer attachments from the entire treadmill assembly and support the enclosure frame upon wheels as a draft vehicle connected behind a truck or automobile. The same training can be effected by moving the enclosure frame relative to the ground or roadway, with the same attachments and other elements above described, attached to the horse 10 to cause him to walk over the ground, while moving with the enclosure frame 13.

What is claimed is:

1. An apparatus for training a horse comprising:
   a. an elongated enclosure frame for receiving a horse, said frame comprising opposed side frame members and front and rear ends,
   b. a head-set device comprising an arm member and at least one linear member, each linear member having first and second end portions,
   c. means mounting said arm member on said side frame member to project from said side frame member transversely over a horse within said enclosure frame and behind the horse's head, in operative position, said mounting means mounting said arm member for fore-and-aft movement with the horse's head relative to said enclosure frame,
   d. first connector means detachably connecting each of said first end portions to the head harness worn by a horse within said enclosure frame, and
   d. second connector means detachably connecting each of said second end portions to said arm member for holding the horse's head in a predetermined attitude.

2. The invention according to claim 1 in which said linear member is flexible.

3. The invention according to claim 1 further comprising biasing means connected to said frame and said arm member for normally resiliently urging said arm member rearward against the pull of the horse's head through said linear member.

4. The invention according to claim 3 in which said biasing means comprises an elongated elastic member having one end connected to said arm member and the opposite end connected to a portion of said frame behind said arm member.

5. The invention according to claim 4 in which said elongated elastic member is a coil spring of predetermined tension.

6. The invention according to claim 4 further comprising a second elongated elastic member having one end connected to said arm member and the opposite end connected to a portion of said frame in front of said arm member.

7. The invention according to claim 1 in which said arm member comprises an upright rein post, said second connector means comprising connector elements vertically spaced on said rein post, each of said connector elements being adapted to be detachably connected to said second end portion of said linear member.

8. The invention according to claim 7 in which each of said connector elements comprises a ring fixed to said rein post.

9. The invention according to claim 1 in which said mounting means for said arm member comprises means on said side frame member for supporting said arm member for swinging movement about a vertical axis so that said arm member may swing between an operative position transversely of a horse within said enclosure frame and an inoperative position outward from said operative position.

10. The invention according to claim 9 in which said swinging mounting means comprises a socket mounted on said side frame member, said arm member comprising a lower vertical post portion adapted to be swivelly received within said socket member, said arm member having an upper portion projecting transversely from said lower portion, said second connector means being adapted to be connected to said upper portion of said arm member.

11. The invention according to claim 10 in which the upper portion of said arm member comprises a laterally inturned intermediate arm portion and an upright rein post projecting upward from said intermediate portion and offset from said lower post portion, said second connector means comprising a plurality of connector elements vertically spaced on said rein post and adapted to be connected to the second end portion of said linear member.

12. The invention according to claim 11 in which said arm member comprises a first arm member swivelly mounted on one of said side frame members and a second arm member swivelly mounted on the opposite side frame member for swinging movement toward adjacent operative central positions over a horse within said enclosure frame, said linear member comprising first and second rein members operatively connected by said first and second connector means to the head harness of a horse and to the connector elements on corresponding rein posts, respectively.

13. The invention according to claim 12 further comprising an elastic member connecting each of said rein posts to portions of said frame behind said rein posts.

14. The invention according to claim 9 further comprising bumper means on said side frame member in front of said arm member for resilient engagement by said arm member to limit the forward movement of said arm member when pulled forward by the horse's head through said linear member.

* * * * *